(12) United States Patent
Gibble (10) Patent No.: US 12,442,336 B1
(45) Date of Patent: Oct. 14, 2025

(54) HYDROGEN COMBUSTION ENGINE ARRANGEMENT AND METHOD OF OPERATING A HYDROGEN COMBUSTION ENGINE ARRANGEMENT

(71) Applicant: VOLVO TRUCK CORPORATION, Gothenburg (SE)

(72) Inventor: John Gibble, Chambersburg, PA (US)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 18/947,103

(22) Filed: Nov. 14, 2024

(51) Int. Cl.
*F02D 19/02* (2006.01)
*F01N 3/20* (2006.01)

(52) U.S. Cl.
CPC ......... *F02D 19/021* (2013.01); *F01N 3/2066* (2013.01)

(58) Field of Classification Search
CPC ............................ F02D 19/021; F01N 3/2066
USPC .......................................................... 60/285
See application file for complete search history.

(56) References Cited

U.S. PATENT DOCUMENTS

2013/0036725 A1* 2/2013 Uno .................. F02D 13/06
60/303
2014/0238000 A1 8/2014 Olivier

FOREIGN PATENT DOCUMENTS

| DE | 102020209154 A1 | | 1/2022 | |
|---|---|---|---|---|
| JP | H0633748 A | * | 2/1994 | ............ F01N 3/206 |
| JP | 2011007047 A | * | 1/2011 | |
| JP | 2021173182 A | * | 11/2021 | |
| WO | 9904145 A1 | | 1/1999 | |

OTHER PUBLICATIONS

A Hydrogen IC Engine and Method of Operating Thereof, Indian patent application by Tata Motors Limited, dated Jan. 18, 2021 (Indian App. IN202141002252).

* cited by examiner

*Primary Examiner* — Mark A Laurenzi
*Assistant Examiner* — Kelsey L Stanek
(74) *Attorney, Agent, or Firm* — Sage Patent Group (57) ABSTRACT

A hydrogen combustion engine arrangement includes a source of hydrogen, an internal combustion engine having at least one cylinder having an inlet opening connected by first hydrogen supply line to the source of hydrogen and an outlet opening, an exhaust aftertreatment system connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and an arrangement for determining a temperature in the EATS, and a computer system configured to control delivery of hydrogen to the EATS in response to a signal from the temperature determining arrangement.

11 Claims, 3 Drawing Sheets

HYDROGEN COMBUSTION ENGINE ARRANGEMENT AND METHOD OF OPERATING A HYDROGEN COMBUSTION ENGINE ARRANGEMENT

TECHNICAL FIELD

The disclosure relates generally to combustion engine arrangements. In particular aspects, the disclosure relates to hydrogen combustion engine arrangements. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

As a means of reducing the greenhouse gas impact and in particular carbon dioxide ($CO_2$) emissions of the transportation industry, hydrogen fueled combustion engines are being developed as an alternative to diesel and gasoline combustion engines. Hydrogen combusts efficiently with low emission of $CO_2$ and hydrocarbon and particulate matter, but challenges remain as Nitrogen Oxides (NOx) are still generated in the combustion process due to high temperatures with nitrogen present in the combustion chamber. In addition to generation of NOx, combustion outlet temperatures can be significantly lower than diesel or gasoline, leading to lower aftertreatment system temperatures. Catalysts in aftertreatment systems have a minimum and an optimum operational temperature that may not be reached quickly during cold start or during normal use, requiring either reduction in engine out NOx generated or increase in engine out temperatures, both of which may be inadequate or not capable of meeting system out emission regulation requirements. It is desirable to provide a hydrogen combustion engine arrangement that facilitates obtaining desired operational temperatures, and that facilitates attaining engine emission requirements.

SUMMARY

According to a first aspect of the disclosure a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means. A technical benefit may include facilitating attaining desired temperature levels in an EATS, and reducing emissions from a hydrogen combustion engine arrangement.

Optionally in some examples, including in at least one preferred example a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the combustion zone comprises ignition means for igniting hydrogen, the computer system being configured to control operation of the ignition means in response to a signal from the temperature determining means. A technical benefit may include facilitating attaining desired temperature levels in an EATS, and reducing emissions from a hydrogen combustion engine arrangement, and the combustion zone comprises ignition means for igniting hydrogen, the computer system being configured to control operation of the ignition means in response to a signal from the temperature determining means. A technical benefit may include facilitating attaining desired temperature levels in an EATS prior to engine start-up and during cold operation.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the combustion zone comprises ignition means for igniting hydrogen, the computer system being configured to control operation of the ignition means in response to a signal from the temperature determining means, wherein the second hydrogen supply line comprises a hydrogen supply line valve, and wherein, prior to starting the internal combustion engine, the computer system is configured to control the hydrogen supply line valve to supply hydrogen through the second hydrogen supply line and operation of the ignition means to generate a flame in the combustion zone. A technical benefit may include facilitating attaining desired temperature levels in an EATS, and reducing emissions from a hydrogen combustion engine arrangement, and the combustion zone comprises ignition means for igniting hydrogen, the computer system being configured to control operation of the ignition means in response to a signal from the temperature determining means, and the second hydrogen supply line comprises a hydrogen supply line, and wherein, prior to starting the internal combustion engine, the computer system is configured to control the hydrogen supply line valve to supply hydrogen through the second hydrogen supply line and operation of the ignition means to generate a flame in the combustion zone. A technical benefit may include facilitating attaining desired temperature levels in an EATS prior to engine start-up and during cold operation.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the combustion zone comprises ignition means for igniting hydrogen, the computer system being configured to control operation of the ignition means in response to a signal from the temperature determining means, wherein the second hydrogen supply line comprises a hydrogen supply line valve, and wherein, prior to starting the internal combustion engine, the computer system is configured to control the hydrogen supply line valve to supply hydrogen through the second hydrogen supply line and operation of the ignition means to generate a flame in the combustion zone, wherein the computer system is configured to control the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature. A technical benefit may include facilitating attaining desired temperature levels in an EATS before combustion of hydrogen can occur without use of a dedicated ignition device.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the combustion zone comprises ignition means for igniting hydrogen, the computer system being configured to control operation of the ignition means in response to a signal from the temperature determining means, wherein the second hydrogen supply line comprises a hydrogen supply line valve, and wherein, prior to starting the internal combustion engine, the computer system is configured to control the hydrogen supply line valve to supply hydrogen through the second hydrogen supply line and operation of the ignition means to generate a flame in the combustion zone, wherein the computer system is configured to control the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature, wherein the first predetermined temperature is a temperature at which hydrogen supplied through the second hydrogen supply line will combust, and the computer system is configured, after starting the internal combustion engine, to cease operation of the ignition means, and supply hydrogen through the second hydrogen supply line where it mixes with exhaust air to generate a flame in the combustion zone at least until the computer system receives a signal from the temperature determining means that the temperature of the EATS is at a second predetermined temperature. A technical benefit may include facilitating attaining desired temperature levels in an EATS after combustion of hydrogen can occur without use of a dedicated ignition device.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the combustion zone comprises ignition means for igniting hydrogen, the computer system being configured to control operation of the ignition means in response to a signal from the temperature determining means, wherein the second hydrogen supply line comprises a hydrogen supply line valve, and wherein, prior to starting the internal combustion engine, the computer system is configured to control the hydrogen supply line valve to supply hydrogen through the second hydrogen supply line and operation of the ignition means to generate a flame in the combustion zone, wherein the computer system is configured to control the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature, wherein the first predetermined temperature is a temperature at which hydrogen supplied through the second hydrogen supply line will combust, and the computer system is configured, after starting the internal combustion engine, to cease operation of the ignition means, and supply hydrogen through the second hydrogen supply line where it mixes with exhaust air to generate a flame in the combustion zone at least until the computer system receives a signal from the temperature determining means that the temperature of the EATS is at a second predetermined temperature, wherein the computer system is configured, after the computer system receives the signal from the temperature determining means that the temperature of the EATS is at the second predetermined temperature, to supply hydrogen to the exhaust line upstream of the SCR without generating a flame. A technical benefit may include facilitating attaining desired temperature levels in an EATS and further reducing emissions from the hydrogen combustion engine arrangement.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the combustion zone comprises ignition means for igniting hydrogen, the computer system being configured to control operation of the ignition means in response to a signal from the temperature determining means, wherein the second hydrogen supply line comprises a hydrogen supply line valve, and wherein, prior to starting the internal combustion engine, the computer system is configured to control the hydrogen supply line valve to supply hydrogen through the second hydrogen supply line and operation of the ignition means to generate a flame in the combustion zone, wherein the computer system is configured to control the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature, wherein the computer system is configured, after the computer system receives a signal from the temperature determining means that the temperature of the EATS is at a second predetermined temperature, to supply hydrogen to the exhaust line upstream of the SCR without generating a flame. A technical benefit may include facilitating attaining desired temperature levels in an EATS and further reducing emissions from the hydrogen combustion engine arrangement.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the second hydrogen supply line comprises a hydrogen supply line valve, and wherein the computer system is configured, after starting the internal combustion engine, to supply hydrogen through the second hydrogen supply line where it generates a flame in the combustion zone at least until the computer system receives a signal from the temperature determining means that the temperature of the EATS is at a predetermined temperature. A technical benefit may include facilitating attaining desired temperature levels in an EATS.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the second hydrogen supply line comprises a hydrogen supply line valve, and wherein the computer system is configured, after starting the internal combustion engine, to supply hydrogen through the second hydrogen supply line where it generates a flame in the combustion zone at least until the computer system receives a signal from the temperature determining means that the temperature of the EATS is at a predetermined temperature, wherein the computer system is configured, after the computer system receives the signal from the temperature determining means that the temperature of the EATS is at the predetermined temperature, to supply hydrogen to the exhaust line upstream of the SCR without generating a flame. A technical benefit may include facilitating attaining desired temperature levels in an EATS and further reducing emissions from the hydrogen combustion engine arrangement.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means, wherein the computer system is configured, after starting the internal combustion engine, and after the computer system receives the signal from the temperature determining means that the temperature of the EATS is at a predetermined temperature, to supply hydrogen to the exhaust line upstream of the SCR without generating a flame. A technical benefit may include facilitating further reducing emissions from the hydrogen combustion engine arrangement by converting NOx into nitrogen and water.

Optionally in some examples, including in at least one preferred example, a hydrogen combustion engine arrangement comprises a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, a computer system configured to control delivery of hydrogen to the EATS in response to a signal from the temperature determining means, and an oxidation catalyst in the EATS, the source of hydrogen being connected to the EATS upstream of the oxidation catalyst, the computer system being configured to supply hydrogen to the EATS upstream of the oxidation catalyst without generating a flame. A technical benefit may include generating heat for the EATS through oxidation of hydrogen.

According to a second aspect of the disclosure, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means. A technical benefit may include facilitating attaining desired temperature levels in an EATS prior to engine start-up and during cold operation.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the combustion zone comprises ignition means for igniting hydrogen, the computer system being configured to control operation of the ignition means in response to the signal from the temperature determining means. A technical benefit may include facilitating attaining desired temperature levels in an EATS prior to engine start-up and during cold operation.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the combustion zone comprises ignition means for igniting hydrogen, the computer system being configured to control operation of the ignition means in response to the signal from the temperature determining means, wherein the second hydrogen supply line comprises a hydrogen supply line valve, and the method further comprises controlling, via the computer system and in response to the signal from the temperature determining means, the hydrogen supply line valve to supply hydrogen through the second hydrogen supply line, and operation of the ignition means to generate a flame in the combustion zone. A technical benefit may include facilitating attaining desired temperature levels in an EATS prior to engine start-up and during cold operation.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the combustion zone comprises ignition means for igniting hydrogen, the computer system being configured to control operation of the ignition means in response to the signal from the temperature determining means, wherein the second hydrogen supply line comprises a hydrogen supply line valve, and the method further comprises controlling, via the computer system and in response to the signal from the temperature determining means, the hydrogen supply line valve to supply hydrogen through the second hydrogen supply line, and operation of the ignition means to generate a flame in the combustion zone, and controlling, via the computer system and in response to the signal from the temperature determining means, the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature. A technical benefit may include facilitating attaining desired temperature levels in an EATS before combustion of hydrogen can occur without use of a dedicated ignition device.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the combustion zone comprises ignition means for igniting hydrogen, the computer system being configured to control operation of the ignition means in response to the signal from the temperature determining means, wherein the second hydrogen supply line comprises a hydrogen supply line valve, and the method further comprises controlling, via the computer system and in response to the signal from the temperature determining means, the hydrogen supply line valve to supply hydrogen through the second hydrogen supply line, and operation of the ignition means to generate a flame in the combustion zone, and controlling, via the computer system and in response to the signal from the temperature determining means, the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature, the first predetermined temperature is a temperature at which hydrogen supplied through the second hydrogen supply line will combust, the method comprising controlling, via the computer system and in response to the signal from the temperature determining means, after starting the internal combustion engine, the ignition means to cease operation, and to supply hydrogen through the second hydrogen supply line where it mixes with exhaust air to generate the flame in the combustion zone at least until the computer system receives a signal from the temperature determining means that the temperature of the EATS is at a second predetermined temperature. A technical benefit may include facilitating attaining desired temperature levels in an EATS after combustion of hydrogen can occur without use of a dedicated ignition device.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the combustion zone comprises ignition means for igniting hydrogen, the computer system being configured to control operation of the ignition means in response to the signal from the temperature determining means, wherein the second hydrogen supply line comprises a hydrogen supply line valve, and the method further comprises controlling, via the computer system and in response to the signal from the temperature determining means, the hydrogen supply line valve to supply hydrogen through the second hydrogen supply line, and operation of the ignition means to generate a flame in the combustion zone, and controlling, via the computer system and in response to the signal from the temperature determining means, the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature, the first predetermined temperature is a temperature at which hydrogen supplied through the second hydrogen supply line will combust, the method comprising controlling, via the computer system and in response to the signal from the temperature determining means, after starting the internal combustion engine, the ignition means to cease operation, and to supply hydrogen through the second hydrogen supply line where it mixes with exhaust air to generate the flame in the combustion zone at least until the computer system receives a signal from the temperature determining means that the temperature of the EATS is at a second predetermined temperature, the method further comprising controlling supply of hydrogen to the exhaust line upstream of the SCR without generating a flame, via the computer system and in response to the signal from the temperature determining means, after the computer system receives the signal from the temperature determining means that the temperature of the EATS is at the second predetermined temperature. A technical benefit may include facilitating attaining desired temperature levels in an EATS and further reducing emissions from the hydrogen combustion engine arrangement.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the combustion zone comprises ignition means for igniting hydrogen, the computer system being configured to control operation of the ignition means in response to the signal from the temperature determining means, wherein the second hydrogen supply line comprises a hydrogen supply line valve, and the method further comprises controlling, via the computer system and in response to the signal from the temperature determining means, the hydrogen supply line valve to supply hydrogen through the second hydrogen supply line, and operation of the ignition means to generate a flame in the combustion zone, and controlling, via the computer system and in response to the signal from the temperature determining means, the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature, the method further comprising controlling supply of hydrogen to the exhaust line upstream of the SCR without generating a flame, via the computer system and in response to the signal from the temperature determining means, after the computer system receives the signal from the temperature determining means that the temperature of the EATS is at a second predetermined temperature. A technical benefit may include facilitating attaining desired temperature levels in an EATS and further reducing emissions from the hydrogen combustion engine arrangement.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the second hydrogen supply line comprises a hydrogen supply line valve, the method comprising controlling, via the computer system and in response to the signal from the temperature determining means, and after starting the internal combustion engine, supply of hydrogen to the combustion zone through the second hydrogen supply line where it generates a flame at least until the computer system receives a signal from the temperature determining means that the temperature of the EATS is at a predetermined temperature. A technical benefit may include facilitating attaining desired temperature levels in an EATS.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the second hydrogen supply line comprises a hydrogen supply line valve, the method comprising controlling, via the computer system and in response to the signal from the temperature determining means, and after starting the internal combustion engine, supply of hydrogen to the combustion zone through the second hydrogen supply line where it generates a flame at least until the computer system receives a signal from the temperature determining means that the temperature of the EATS is at a predetermined temperature, the method further comprising controlling, via the computer system and in response to the signal from the temperature determining means, after the computer system receives the signal from the temperature determining means that the temperature of the EATS is at the predetermined temperature, supply of hydrogen to the exhaust line upstream of the SCR without generating a flame. A technical benefit may include facilitating attaining desired temperature levels in an EATS and further reducing emissions from the hydrogen combustion engine arrangement.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, the method further comprising controlling, via the computer system and in response to the signal from the temperature determining means, after starting the internal combustion engine, and after the computer system receives the signal from the temperature determining means that the temperature of the EATS is at a predetermined temperature, supply of hydrogen to the exhaust line upstream of the SCR without generating a flame. A technical benefit may include facilitating further reducing emissions from the hydrogen combustion engine arrangement by converting nitrogen oxides into nitrogen and water.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, the method further comprising controlling, via the computer system and in response to the signal from the temperature determining means, after starting the internal combustion engine, and after the computer system receives the signal from the temperature determining means that the temperature of the EATS is at a predetermined temperature, supply of hydrogen to the exhaust line upstream of the SCR without generating a flame, wherein the hydrogen supplied to the exhaust line upstream of the SCR without generating a flame acts as a reducing agent and converts nitrogen oxides to nitrogen and water. A technical benefit may include facilitating reduction of emissions from the hydrogen combustion engine.

Optionally in some examples, including in at least one preferred example, a method of operating a hydrogen combustion engine arrangement is provided, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means, wherein the hydrogen combustion engine arrangement comprises an oxidation catalyst in the EATS and the source of hydrogen is connected to the EATS upstream of the oxidation catalyst, the method comprising supplying hydrogen to the EATS upstream of the oxidation catalyst without generating a flame, and generating heat in the catalyst through oxidation of hydrogen. A technical benefit may include facilitating attaining desired temperature levels in an EATS.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

Figure 1:
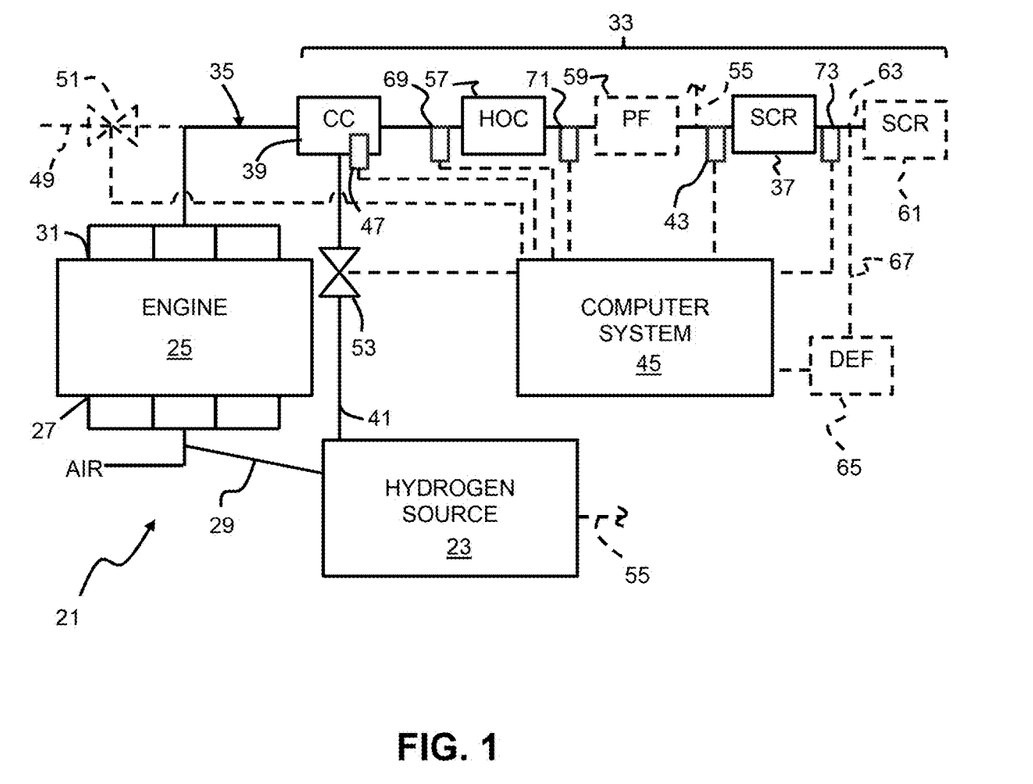
FIG. 1 is an exemplary version of a hydrogen combustion engine arrangement according to an example.

A hydrogen combustion engine arrangement 21 according to an aspect of the present invention is shown in FIG. 1. The engine arrangement 21 comprises a source of hydrogen 23 and an internal combustion engine 25 having at least one cylinder 25', the cylinder having an inlet opening 27 connected by a first hydrogen supply line 29 to the source of hydrogen and an outlet opening 31. The engine arrangement 21 further comprises an exhaust aftertreatment system (EATS) 33 connected by an exhaust line 35 to the outlet opening 31 of the at least one cylinder 25'. The EATS 33 includes a selective catalytic reduction system (SCR) 37, a combustion zone 39 upstream of the SCR, the combustion zone being connected to the source of hydrogen 23 by a second hydrogen supply line 41, and a means 43 for determining a temperature in the EATS. The temperature determining means 43 can be a device installed in the exhaust line for sensing temperature or may be an arrangement that calculates temperature based on other information, such as fuel consumption and/or modeling. The combustion zone 39 can be a region within the exhaust line 35 or may be an added component in the exhaust line in which combustion is intended to occur. The combustion zone 39 ordinarily comprises ignition means 47 such as a spark plug or a glow plug for igniting hydrogen.

The engine arrangement 21 further comprises a computer system 45 configured to control delivery of hydrogen to the combustion zone 39 in response to a signal from the temperature determining means 43. The computer system 45 will ordinarily be configured to control operation of the ignition means 47 in response to a signal from the temperature determining means 43.

The hydrogen combustion engine arrangement 21 may comprise an air supply line 49 connected to the exhaust line upstream of the combustion zone, however, as there will ordinarily be sufficient oxygen in the engine exhaust to permit hydrogen combustion during engine operation, and, as long as there is sufficient air in the exhaust line 35 for combustion when the engine is not operating, a dedicated air supply line may be omitted. For sake of discussion, it will be assumed that the hydrogen combustion engine arrangement 21 includes a dedicated air supply line, and also includes an air supply line valve 51 in the air supply line, however, it will be appreciated that these components will ordinarily be optional.

The second hydrogen supply line 41 ordinarily comprises a hydrogen supply line valve 53.

Prior to starting the internal combustion engine 25, the computer system 45 can be configured to control the hydrogen supply line valve 53 and the air supply line valve 51 (if provided) to supply hydrogen through the second hydrogen supply line 41, to supply air to the exhaust line 35 through the air supply line 49 (if provided), and operation of the ignition means 47 to generate a flame in the combustion zone.

The computer system 45 can be configured, prior to starting the internal combustion engine 25, to control the hydrogen supply line valve 53 and the air supply line valve 51 (if provided) to supply hydrogen through the second hydrogen supply line 41, to supply air to the exhaust line 35 through the air supply line 49 (if provided), and operation of the ignition means 47 to generate the flame in the combustion zone at least until the computer system receives a signal from the temperature determining means 43 that the temperature of the EATS 33 is at a first predetermined temperature. The first predetermined temperature may be a temperature which is optimal for operation of the SCR 37 or other EATS components, but may be a lower temperature, such as a temperature below the temperature at which exhaust from an operating internal combustion engine 25 will cause ignition of hydrogen introduced to the combustion zone 39 via the second hydrogen supply line 41.

The computer system 45 can be configured, after starting the internal combustion engine 25 to close the air supply line valve 51 (if provided), cease operation of the ignition means 47, and supply hydrogen through the second hydrogen supply line 41 where, provided temperature of the system is sufficiently high, to generate a flame at least until the computer system receives a signal from the temperature determining means 43 that the temperature of the EATS 33 is at a second predetermined temperature, such as a temperature which is optimal for operation of the SCR 37 or other EATS components. In this way, the temperature of the EATS 33 and the SCR 37 can continue to be increased without the need to operate the ignition means 47 as long as the temperature of the system is sufficient to cause ignition of the hydrogen introduced via the second hydrogen supply line 41.

The computer system 45 can be configured, after the computer system receives the signal from the temperature determining means 43 that the temperature of the EATS 33 is at the second predetermined temperature (usually the temperature for optimal operation of the SCR 37), and during operation of the internal combustion engine 25, to supply hydrogen to the exhaust line 35 upstream of the SCR 37 without generating a flame. In this way, the hydrogen can function as a reducing agent for reducing NOx in the engine exhaust to nitrogen and water. Hydrogen may be introduced to the combustion chamber 39 via the hydrogen supply line 41 or, alternatively, via a third hydrogen supply line 55 (shown in phantom) which need not be at or upstream of the combustion chamber.

The computer system 45 can also be configured, after the computer system receives a signal from the temperature determining means 43 that the temperature of the EATS 33 is at a predetermined temperature (usually but not necessarily a temperature which is optimal for operation of the SCR 37 or other EATS components), regardless whether the internal combustion engine 25 is started, to supply hydrogen to the exhaust line upstream of the SCR without generating a flame. Hydrogen may be introduced to the combustion chamber 39 via the hydrogen supply line 41 or, alternatively, via the third hydrogen supply line 53 (shown in phantom) which need not be at or upstream of the combustion chamber.

The EATS 33 of the hydrogen combustion engine arrangement 21 may further include a hydrogen oxidation catalyst (HOC) 57 and a particulate filter (PF) 57. While the HOC 55 is illustrated as being upstream of the SCR 37, the SCR could, alternatively, be upstream of the HOC or the HOC could be a catalyst that oxidizes hydrogen and reduces NOx. The source of hydrogen 23 can be connected to the EATS 33 upstream of the HOC 57, and the computer system 45 can be configured to supply hydrogen to the EATS from the source of hydrogen, such as through the second hydrogen supply line 41 or through another line, to a point in the EATS upstream of the HOC without generating a flame. In this way, the HOC 57 can be used to generate heat to heat the EATS components in an exothermic process without combustion.

Another SCR 59 (shown in phantom) may be added to the EATS 33 to provide for multi-stage reduction. A dosing nozzle 61 (shown in phantom) for providing diesel exhaust fluid (DEF) or urea upstream of the additional SCR 59 from a source 63 (shown in phantom) of DEF or urea. The computer system 45 can control dosing of the DEF or urea by controlling a pump (not shown) in a line 65 (shown in phantom) between the dosing nozzle 61 and the source 63 of DEF or urea. The additional SCR 59 may be, but is not necessarily, downstream of the SCR 37.

The temperature determining means 43 may include a temperature sensor upstream of the SCR 33, as well as additional temperature sensors 69, 71, 73 in the EATS 33 at desired locations upstream or downstream of the SCR to monitor temperatures in the EATS and the various components. The computer system 45 can be configured to supply hydrogen to the EATS and, if appropriate, operate the ignition means 47 to control temperatures to desired operating temperatures in any of the various components in the EATS in addition to the SCR 37.

Figure 2:
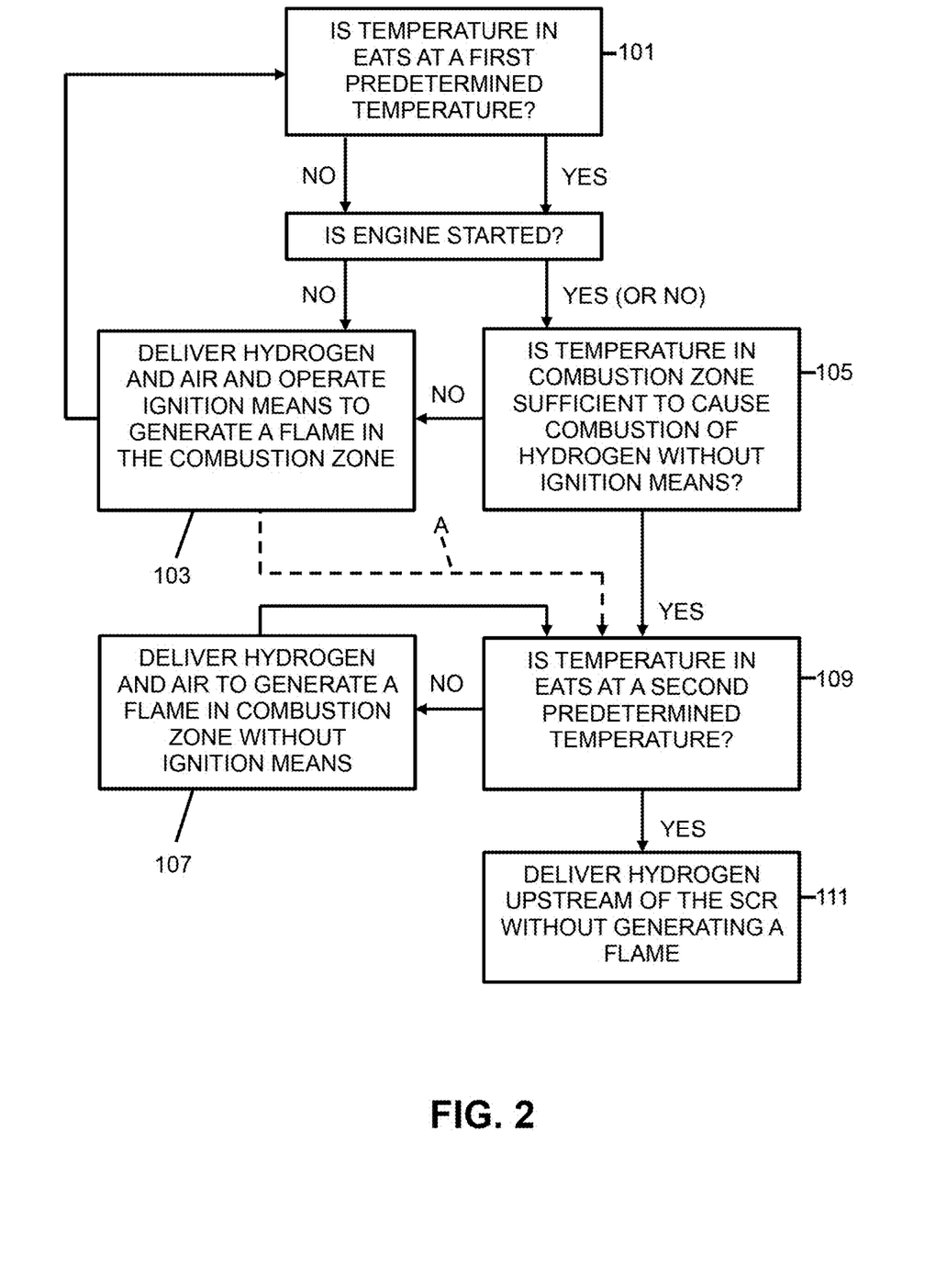
FIG. 2 is a flow chart showing an exemplary version of a method of operating a hydrogen combustion engine arrangement.

A method of operating the hydrogen combustion engine arrangement 21 of FIG. 1 is illustrated in the flow chart of FIG. 2. According to the method, at step 101, the temperature determining means 43 determines whether a temperature of the EATS 33 is at a first predetermined temperature either by measuring with a temperature sensor or by calculating a temperature based on other information, such as fuel consumption rate. The first predetermined temperature may be any desired temperature, however, it will ordinarily either be a temperature at which hydrogen will combust without the need for operation of the ignition means or an optimal operation temperature for the EATS components, particularly the SCR 33. The temperature determining means 43 sends a signal corresponding to the temperature of the EATS 33 from the temperature determining means to the computer system 45.

Delivery of hydrogen to the combustion zone 39 and operation of the ignition means 47 is controlled, via the computer system 45, in response to the signal from the temperature determining means 43.

If the temperature of the EATS 33 is not at the first predetermined temperature, prior to starting the internal combustion engine 25, at step 103, the computer system 45 controls the hydrogen supply line valve 53 and the air supply line valve 51 (if provided) to supply hydrogen through the second hydrogen supply line 41, to supply air to the exhaust line 35 through the air supply line 49 (if provided), and to operate the ignition means 47 to generate a flame in the combustion zone 39. The computer system 45 continues to control the hydrogen supply line valve 53 and the air supply line valve 51 (if provided) to supply hydrogen through the second hydrogen supply line 41, to supply air to the exhaust line 35 through the air supply line 49 (if provided), and operation of the ignition means 47 to generate the flame in the combustion zone 39 at least until the computer system receives a signal from the temperature determining means that the temperature of the EATS 33 is at a first predetermined temperature.

At step 105, usually, but not necessarily after starting the internal combustion engine 25, it is determined if the temperature in the combustion zone 39 is sufficient to combust hydrogen without operating the ignition means and, if so, the computer system 45 can control the ignition means 47 to cease operation and controls the hydrogen supply line valve 53 to continue to be open to supply hydrogen through the second hydrogen supply line 53. If the internal combustion engine 25 is operating, if an air supply line valve 51 is provided, the computer system 45 may close the air supply line valve as there will ordinarily be sufficient air in the exhaust gas for combustion of hydrogen in the combustion zone 39. If the internal combustion engine 25 is not operating and if an air supply line valve 51 is provided, the computer system 45 may still close the air supply line valve as there may still be sufficient air in the exhaust line 35 for combustion of hydrogen in the combustion zone 39. Regardless if there is an air supply line 49 and air supply line valve 51, if the temperature in the combustion zone 39 is sufficient to combust hydrogen without operating the ignition means, after the computer system 45 controls the ignition means 47 to cease operation and controls the hydrogen supply line valve 53 to continue to be open to supply hydrogen through the second hydrogen supply line 53, at step 107, the hydrogen mixes with air to continue to generate a flame in the combustion zone at least until, at step 109, the computer system receives a signal from the temperature determining means 43 that the temperature of the EATS is at a second predetermined temperature, usually a temperature for optimal operation of the components of the EATS, particularly the SCR 37.

At step 111, while the internal combustion engine 25 is operating, the computer system 45, in response to the signal from the temperature determining means 43, and after the computer system receives the signal from the temperature determining means that the temperature of the EATS is at an optimal operating temperature, usually the second predetermined temperature, controls the supply of hydrogen to the exhaust line 35 upstream of the SCR 37, either through the second hydrogen supply line 41 or via another hydrogen supply line, such as the third hydrogen supply line 55, without generating a flame. In this way, the supplied hydrogen functions as a reducing agent for reducing NOx in the SCR 37 to nitrogen and water.

It will be appreciated that modifications to the method described in steps 101-111 may be made. The method described in steps 101-111 is particularly useful for first, prior to operating the internal combustion engine 25, supplying hydrogen and operating the ignition means 47 to cause combustion in the combustion zone 39 to preheat the EATS 33 including the SCR 37 up to a first temperature, then, after starting the internal combustion engine, stopping operation of the ignition means 47 but continuing combustion, such as due to combining supplied hydrogen with hot exhaust gas and/or heat in the system, until a second temperature is reached, the second temperature being an optimal operating temperature for the EATS and the SCR. After the optimal operating temperature is reached, hydrogen can continue to be supplied but without being combusted so that the hydrogen can function as a reducing agent in the SCR 37.

If desired, the steps in the method may be altered or omitted. For example, the computer system 45 may continue to operate the ignition means 47 to generate a flame in the combustion zone 39 even though the temperature in the combustion zone 39 is sufficient to cause combustion upon combining with the supplied hydrogen and, after the temperature of the EATS 33 and the SCR 37 are at a desired temperature for operation of the EATS components at step 109, turning off the ignition means and continuing to supply hydrogen without generating a flame so that the hydrogen functions as a reducing agent. In other words, steps 105 and 107 may be omitted as shown in phantom by line A. Usually, the internal combustion engine 25 will be operating in this circumstance and, if desired, hydrogen can be supplied without generating a flame in the combustion zone 39 to function as a reducing agent in the SCR 37 after a desired temperature in the EATS exists, without necessarily combusting hydrogen in the combustion zone.

If the internal combustion engine 25 is not operating, yet the temperature of the EATS components is at a desired level, the computer system 45 may also control the hydrogen combustion engine arrangement 21 components to skip directly to step 109, if desired or necessary as indicated by "Yes (or No)" between steps 101 and 105 in FIG. 2.

Figure 3:
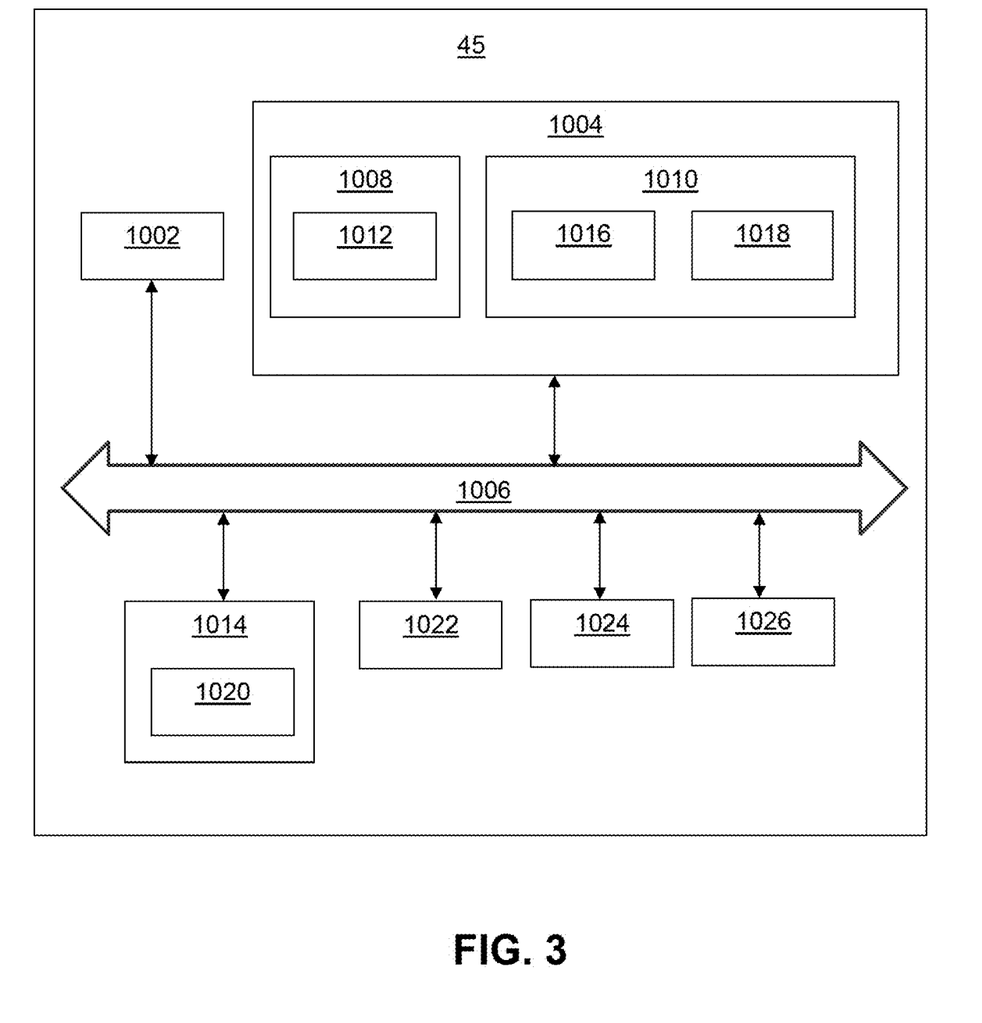
FIG. 3 is a schematic diagram of an exemplary computer system for implementing examples disclosed herein, according to an example.

FIG. 3 is a schematic diagram of a computer system 45 for implementing examples disclosed herein. The computer system 45 is adapted to execute instructions from a computer-readable medium to perform these and/or any of the functions or processing described herein. The computer system 45 may be connected (e.g., networked) to other machines in a LAN, an intranet, an extranet, or the Internet. While only a single device is illustrated, the computer system 45 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, the control system may include a single control unit or a plurality of control units connected or otherwise communicatively coupled to each other, such that any performed function may be distributed between the control units as desired. Further, such devices may communicate with each other or other devices by various system architectures, such as directly or via a Control system Area Network (CAN) bus, etc.

The computer system 45 may comprise at least one computing device or electronic device capable of including firmware, hardware, and/or executing software instructions to implement the functionality described herein. The computer system 45 may include processing circuitry 1002 (e.g., processing circuitry including one or more processor devices or control units), a memory 1004, and a system bus 1006. The computer system 45 may include at least one computing device having the processing circuitry 1002. The system bus 1006 provides an interface for system components including, but not limited to, the memory 1004 and the processing circuitry 1002. The processing circuitry 1002 may include any number of hardware components for conducting data or signal processing or for executing computer code stored in memory 1004. The processing circuitry 1002 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 1002 may further include computer executable code that controls operation of the programmable device.

The system bus 1006 may be any of several types of bus structures that may further interconnect to a memory bus (with or without a memory control system), a peripheral bus, and/or a local bus using any of a variety of bus architectures. The memory 1004 may be one or more devices for storing data and/or computer code for completing or facilitating methods described herein. The memory 1004 may include database components, object code components, script components, or other types of information structure for supporting the various activities herein. Any distributed or local memory device may be utilized with the systems and methods of this description. The memory 1004 may be communicably connected to the processing circuitry 1002 (e.g., via a circuit or any other wired, wireless, or network connection) and may include computer code for executing one or more processes described herein. The memory 1004 may include non-volatile memory 1008 (e.g., read-only memory (ROM), erasable programmable read-only memory (EPROM), electrically erasable programmable read-only memory (EEPROM), etc.), and volatile memory 1010 (e.g., random-access memory (RAM)), or any other medium which can be used to carry or store desired program code in the form of machine-executable instructions or data structures and which can be accessed by a computer or other machine with processing circuitry 1002. A basic input/output system (BIOS) 1012 may be stored in the non-volatile memory 1008 and can include the basic routines that help to transfer information between elements within the computer system 45.

The computer system 45 may further include or be coupled to a non-transitory computer-readable storage medium such as the storage device 1014, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 1014 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 1014 and/or in the volatile memory 1010, which may include an operating system 1016 and/or one or more program modules 1018. All or a portion of the examples disclosed herein may be implemented as a computer program 1020 stored on a transitory or non-transitory computer-usable or computer-readable storage medium (e.g., single medium or multiple media), such as the storage device 1014, which includes complex programming instructions (e.g., complex computer-readable program code) to cause the processing circuitry 1002 to carry out actions described herein. Thus, the computer-readable program code of the computer program 1020 can comprise software instructions for implementing the functionality of the examples described herein when executed by the processing circuitry 1002. In some examples, the storage device 1014 may be a computer program product (e.g., readable storage medium) storing the computer program 1020 thereon, where at least a portion of a computer program 1020 may be loadable (e.g., into a processor) for implementing the functionality of the examples described herein when executed by the processing circuitry 1002. The processing circuitry 1002 may serve as a control system or control system for the computer system 45 that is to implement the functionality described herein.

The computer system 45 may include an input device interface 1022 configured to receive input and selections to be communicated to the computer system 45 when executing instructions, such as from a keyboard, mouse, touch-sensitive surface, etc. Such input devices may be connected to the processing circuitry 1002 through the input device interface 1022 coupled to the system bus 1006 but can be connected through other interfaces, such as a parallel port, an Institute of Electrical and Electronic Engineers (IEEE) 1394 serial port, a Universal Serial Bus (USB) port, an IR interface, and the like. The computer system 45 may include an output device interface 1024 configured to forward output, such as to a display, a video display unit (e.g., a liquid crystal display (LCD) or a cathode ray tube (CRT)). The computer system 45 may include a communications interface 1026 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Example 1. A hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS, and a computer system configured to control delivery of hydrogen to the EATS in response to a signal from the temperature determining means.

Example 2. The hydrogen combustion engine arrangement as set forth in example 1, wherein the combustion zone comprises ignition means for igniting hydrogen, the computer system being configured to control operation of the ignition means in response to a signal from the temperature determining means.

Example 3. The hydrogen combustion engine arrangement as set forth in example 2, wherein the second hydrogen supply line comprises a hydrogen supply line, and wherein, prior to starting the internal combustion engine, the computer system is configured to control the hydrogen supply line valve to supply hydrogen through the second hydrogen supply line and operation of the ignition means to generate a flame in the combustion zone.

Example 4. The hydrogen combustion engine arrangement as set forth in example 3, wherein the computer system is configured to control the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature.

Example 5. The hydrogen combustion engine arrangement as set forth in example 4, wherein the computer system is configured, after starting the internal combustion engine, to cease operation of the ignition means, and supply hydrogen through the second hydrogen supply line where it mixes with exhaust air to generate a flame in the combustion zone at least until the computer system receives a signal from the temperature determining means that the temperature of the EATS is at a second predetermined temperature.

Example 6. The hydrogen combustion engine arrangement as set forth in example 5, wherein the computer system is configured, after the computer system receives the signal from the temperature determining means that the temperature of the EATS is at the second predetermined temperature, to supply hydrogen to the exhaust line upstream of the SCR without generating a flame.

Example 7. The hydrogen combustion engine arrangement as set forth in example 4, wherein the computer system is configured, after the computer system receives a signal from the temperature determining means that the temperature of the EATS is at a second predetermined temperature, to supply hydrogen to the exhaust line upstream of the SCR without generating a flame.

Example 8. The hydrogen combustion engine arrangement as set forth in example 1, wherein the second hydrogen supply line comprises a hydrogen supply line valve, and wherein the computer system is configured, after starting the internal combustion engine, to supply hydrogen through the second hydrogen supply line where it mixes with exhaust air to generate a flame in the combustion zone at least until the computer system receives a signal from the temperature determining means that the temperature of the EATS is at a predetermined temperature.

Example 9. The hydrogen combustion engine arrangement as set forth in example 8, wherein the computer system is configured, after the computer system receives the signal from the temperature determining means that the temperature of the EATS is at the second predetermined temperature, to supply hydrogen to the exhaust line upstream of the SCR without generating a flame.

Example 10. The hydrogen combustion engine arrangement as set forth in example 1, wherein the computer system is configured, after starting the internal combustion engine, and after the computer system receives the signal from the temperature determining means that the temperature of the EATS is at a predetermined temperature, to supply hydrogen to the exhaust line upstream of the SCR without generating a flame.

Example 11. The hydrogen combustion engine arrangement as set forth in example 1, comprising an oxidation catalyst in the EATS, the source of hydrogen being connected to the EATS upstream of the oxidation catalyst, the computer system being configured to supply hydrogen to the EATS upstream of the oxidation catalyst without generating a flame.

Example 12. A method of operating a hydrogen combustion engine arrangement, the hydrogen combustion engine arrangement comprising a source of hydrogen, an internal combustion engine having at least one cylinder having an inlet opening connected by first hydrogen supply line to the source of hydrogen and an outlet opening, an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and means for determining a temperature in the EATS, and a computer system configured to control delivery of hydrogen to the combustion zone in response to a signal from the temperature determining means, the method comprising sending a signal corresponding to the temperature of the EATS from the temperature determining means to the computer system, and controlling, via the computer system, delivery of hydrogen to the EATS in response to the signal from the temperature determining means.

Example 13. The method as set forth in example 12, wherein the combustion zone comprises ignition means for igniting hydrogen, the computer system being configured to control operation of the ignition means in response to the signal from the temperature determining means.

Example 14. The method as set forth in example 13, wherein the second hydrogen supply line comprises a hydrogen supply line valve, the method comprising, controlling, via the computer system and in response to the signal from the temperature determining means, the hydrogen supply line valve to supply hydrogen through the second hydrogen supply line, and operation of the ignition means to generate a flame in the combustion zone.

Example 15. The method as set forth in example 14, comprising controlling, via the computer system and in response to the signal from the temperature determining means, the hydrogen supply line valve to supply hydrogen through the second hydrogen supply line, and operation of the ignition means to generate the flame in the combustion zone at least until the computer system receives a signal from the temperature determining means that the temperature of the EATS is at a first predetermined temperature.

Example 16. The method as set forth in example 15, comprising controlling, via the computer system and in response to the signal from the temperature determining means, after starting the internal combustion engine, the ignition means to cease operation, and to supply hydrogen through the second hydrogen supply line where it mixes with exhaust air to generate the flame in the combustion zone at least until the computer system receives a signal from the temperature determining means that the temperature of the EATS is at a second predetermined temperature.

Example 17. The method as set forth in example 16, comprising controlling supply of hydrogen to the exhaust line upstream of the SCR without generating a flame, via the computer system and in response to the signal from the temperature determining means, after the computer system receives the signal from the temperature determining means that the temperature of the EATS is at the second predetermined temperature.

Example 18. The method as set forth in example 15, comprising controlling supply of hydrogen to the exhaust line upstream of the SCR without generating a flame, via the computer system and in response to the signal from the temperature determining means, after the computer system receives the signal from the temperature determining means that the temperature of the EATS is at a second predetermined temperature.

Example 19. The method as set forth in example 12, wherein the second hydrogen supply line comprises a hydrogen supply line valve, the method comprising controlling, via the computer system and in response to the signal from the temperature determining means, and after starting the internal combustion engine, supply of hydrogen to the combustion zone through the second hydrogen supply line where it mixes with exhaust air to generate a flame at least until the computer system receives a signal from the temperature determining means that the temperature of the EATS is at a predetermined temperature.

Example 20. The method as set forth in example 19, comprising controlling, via the computer system and in response to the signal from the temperature determining means, after the computer system receives the signal from the temperature determining means that the temperature of the EATS is at the second predetermined temperature, supply of hydrogen to the exhaust line upstream of the SCR without generating a flame.

Example 21. The method as set forth in example 12, comprising controlling, via the computer system and in response to the signal from the temperature determining means, after starting the internal combustion engine, and after the computer system receives the signal from the temperature determining means that the temperature of the EATS is at a predetermined temperature, supply of hydrogen to the exhaust line upstream of the SCR without generating a flame.

Example 22. The method as set forth in example 21, wherein the hydrogen supplied to the exhaust line upstream of the SCR without generating a flame acts as a reducing agent and converts nitrogen oxides to nitrogen and water.

Example 23. The method as set forth in example 12, wherein the hydrogen combustion engine arrangement comprises an oxidation catalyst in the EATS and the source of hydrogen is connected to the EATS upstream of the oxidation catalyst, the method comprising supplying hydrogen to the EATS upstream of the oxidation catalyst without generating a flame, and generating heat in the catalyst through oxidation of hydrogen.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A hydrogen combustion engine arrangement, comprising:
   a source of hydrogen;
   an internal combustion engine having at least one cylinder having an inlet opening connected by first hydrogen supply line to the source of hydrogen and an outlet opening;
   an exhaust aftertreatment system (EATS) connected by an exhaust line to the outlet opening of the at least one cylinder, the EATS including a selective catalytic reduction system (SCR), a combustion zone upstream of the SCR, the combustion zone being connected to the source of hydrogen by a second hydrogen supply line, and a means for determining a temperature in the EATS; and
   a computer system configured to control delivery of hydrogen to the EATS in response to a signal from the means for determining a temperature.

2. The hydrogen combustion engine arrangement as set forth in claim 1, wherein the combustion zone comprises an ignition means for igniting hydrogen, the computer system being configured to control operation of the ignition means in response to a signal from the means for determining a temperature.

3. The hydrogen combustion engine arrangement as set forth in claim 2, wherein the second hydrogen supply line comprises a hydrogen supply line valve, and wherein, prior to starting the internal combustion engine, the computer system is configured to control the hydrogen supply line valve to supply hydrogen through the second hydrogen supply line and operation of the ignition means to generate a flame in the combustion zone.

4. The hydrogen combustion engine arrangement as set forth in claim 3, wherein the computer system is configured to control the hydrogen supply line valve to supply hydrogen through the second hydrogen supply line, and operation of the ignition means to generate the flame in the combustion zone at least until the computer system receives a signal from the means for determining a temperature that the temperature of the EATS is at a first predetermined temperature.

5. The hydrogen combustion engine arrangement as set forth in claim 4, wherein the first predetermined temperature is a temperature at which hydrogen supplied through the second hydrogen supply line will combust, and the computer system is configured, after starting the internal combustion engine, to cease operation of the ignition means, and supply hydrogen through the second hydrogen supply line where it mixes with exhaust air to generate a flame in the combustion zone at least until the computer system receives a signal from the means for determining a temperature that the temperature of the EATS is at a second predetermined temperature.

6. The hydrogen combustion engine arrangement as set forth in claim 5, wherein the computer system is configured, after the computer system receives the signal from the means for determining a temperature that the temperature of the EATS is at the second predetermined temperature, to supply hydrogen to the exhaust line upstream of the SCR without generating a flame.

7. The hydrogen combustion engine arrangement as set forth in claim 4, wherein the computer system is configured, after the computer system receives a signal from the means for determining a temperature that the temperature of the EATS is at a second predetermined temperature, to supply hydrogen to the exhaust line upstream of the SCR without generating a flame.

8. The hydrogen combustion engine arrangement as set forth in claim 1, wherein the second hydrogen supply line comprises a hydrogen supply line valve, and wherein the computer system is configured, after starting the internal combustion engine, to supply hydrogen through the second hydrogen supply line where it the hydrogen is ignited and generates a flame in the combustion zone at least until the computer system receives a signal from the means for determining a temperature that the temperature of the EATS is at a predetermined temperature.

9. The hydrogen combustion engine arrangement as set forth in claim 8, wherein the computer system is configured, after the computer system receives the signal from the means for determining a temperature that the temperature of the EATS is at the predetermined temperature, to supply hydrogen to the exhaust line upstream of the SCR without generating a flame.

10. The hydrogen combustion engine arrangement as set forth in claim 1, wherein the computer system is configured, after starting the internal combustion engine, and after the computer system receives the signal from the means for determining a temperature that the temperature of the EATS is at a predetermined temperature, to supply hydrogen to the exhaust line upstream of the SCR without generating a flame.

11. The hydrogen combustion engine arrangement as set forth in claim 1, comprising an oxidation catalyst in the EATS, the source of hydrogen being connected to the EATS upstream of the oxidation catalyst, the computer system being configured to supply hydrogen to the EATS upstream of the oxidation catalyst without generating a flame.

* * * * *